(12) United States Patent
Kimura et al.

(10) Patent No.: US 8,574,766 B2
(45) Date of Patent: Nov. 5, 2013

(54) COMPOSITE MATERIAL LAYER AND METHOD OF PRODUCING THE SAME, AND SOLID STATE BATTERY AND METHOD OF PRODUCING THE SAME

(75) Inventors: Kenji Kimura, Nishikamo-gun (JP); Masahiro Tatsumisago, Sakai (JP); Akitoshi Hayashi, Sakai (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 664 days.

(21) Appl. No.: 12/532,543

(22) PCT Filed: Mar. 21, 2008

(86) PCT No.: PCT/JP2008/056005
§ 371 (c)(1),
(2), (4) Date: Sep. 22, 2009

(87) PCT Pub. No.: WO2008/123394
PCT Pub. Date: Oct. 16, 2008

(65) Prior Publication Data
US 2010/0112456 A1    May 6, 2010

(30) Foreign Application Priority Data

Mar. 23, 2007  (JP) ................................ 2007-077665
Jun. 7, 2007   (JP) ................................ 2007-151734

(51) Int. Cl.
*H01M 4/62*    (2006.01)

(52) U.S. Cl.
USPC ....................... 429/232; 429/304; 252/182.1

(58) Field of Classification Search
USPC ............. 429/304, 232; 501/2, 140; 252/182.1
See application file for complete search history.

(56) References Cited

U.S. PATENT DOCUMENTS

| 5,677,081 A | 10/1997 | Iwamoto et al. |
| 7,517,616 B2 * | 4/2009 | Kugai et al. ................... 429/304 |
| 2008/0057390 A1 | 3/2008 | Kondo et al. |

FOREIGN PATENT DOCUMENTS

| CN | 1428011 A | 7/2003 |
| EP | 0 704 920 A1 | 4/1996 |
| EP | 2 0 704 920 A1 | 4/1996 |
| EP | 2 096 693 A1 | 9/2009 |
| EP | 2 139 062 A1 | 12/2009 |
| JP | 6-283156 A | 10/1994 |

(Continued)

OTHER PUBLICATIONS

Computer-generated English translation of JP 2004-265685 (Kiyono et al.), from the Japanese Patent Office website (doc date Sep. 2004).*

(Continued)

*Primary Examiner* — Stephen J Kalafut
(74) *Attorney, Agent, or Firm* — Kenyon & Kenyon LLP

(57) ABSTRACT

A solid state battery excellent in pressure formability is provided. A positive electrode composite material layer includes sulfide glass unheated and a positive electrode active material. The sulfide glass and the positive electrode active material are pressure-formed and in contact with each other. A negative electrode composite material layer includes sulfide glass unheated and a negative electrode active material. The sulfide glass and the negative electrode active material are pressure-formed and in contact with each other.

8 Claims, 14 Drawing Sheets

(56) References Cited

FOREIGN PATENT DOCUMENTS

| | | | |
|---|---|---|---|
| JP | 8-138724 | A | 5/1996 |
| JP | 8-148180 | A | 6/1996 |
| JP | 2001-126740 | A | 5/2001 |
| JP | 2003-059492 | A | 2/2003 |
| JP | 2003-208919 | A | 7/2003 |
| JP | 2004-265685 | A | 9/2004 |
| JP | 2004-348972 | A | 12/2004 |
| JP | 2004-348973 | A | 12/2004 |
| JP | 2005-353309 | A | 12/2005 |
| JP | 2008-084851 | A | 4/2008 |
| JP | 2008-103280 | A | 5/2008 |
| JP | 2008-103282 | A | 5/2008 |

OTHER PUBLICATIONS

Computer-generated English translation of JP 2004-348972 (Kiyono et al.), from the Japanese Patent Office website (doc date Dec. 2004).*

Akitoshi Hayashi, et al.: *High Lithium Ion Conductivity of Glass-Ceramics Derived from Mechanically Milled Glassy Powders*; Chemistry Letters 2001, The Chemical Society of Japan, pp. 872-873, Sep. 5, 2001.

Office Action issued Jul. 21, 2011 in CN Application No. 200880009623.8 and English translation thereof.

Supplementary European Search Report, Mar. 18, 2011.

Office Action issued on Mar. 12, 2012 in Chinese Patent Application No. 200880009623.8 and English translation thereof.

* cited by examiner

LiCoO2+SE

LiNi0.5Mn0.5O2+SE

FeO+SE

α-Fe2O3+SE

COMPOSITE MATERIAL LAYER AND METHOD OF PRODUCING THE SAME, AND SOLID STATE BATTERY AND METHOD OF PRODUCING THE SAME

This is a 371 national phase application of PCT/JP2008/056005 filed 21 Mar. 2008, claiming priority to Japanese Patent Applications No. 2007-077665 filed 23 Mar. 2007, and No. 2007-151734 filed 7 Jun. 2007, the contents of which are incorporated herein by reference.

TECHNICAL FIELD

The present invention relates generally to composite material layers and solid state batteries, and methods of producing the same, and particularly to composite material layers and solid state batteries that employ sulfide glass, and methods of producing the same.

BACKGROUND ART

Conventional batteries are disclosed for example in Japanese Patent Laying-open Nos. 2004-265685, 2004-348972, 2004-348973, and 2003-208919.

DISCLOSURE OF THE INVENTION

Conventionally, lithium ion conducting glass ceramic has been obtained as follows: Lithium sulfide and phosphorus pentasulfide are used as starting materials, and they are mechanically milled to provide sulfide glass which is in turn heated at a temperature equal to or higher than the glass transition point to obtain lithium ion conducting glass ceramic. This lithium ion conducting glass ceramic is used to produce all solid state batteries. However, the lithium ion conducting glass ceramic is crystallized powder and thus disadvantageously poor in pressure-formability.

The present invention has been made to overcome such disadvantage as described above, and it contemplates a composite material layer and a solid state battery that are excellent in formability.

The present invention provides a composite material layer including: sulfide glass unheated; and an active material for one of a positive electrode and a negative electrode. The sulfide glass and the active material are pressure-formed and in contact with each other.

The composite material layer thus configured contains sulfide glass having viscosity and excellent in pressure-formability. It can thus closely adhere to an active material surrounding it and thus be excellent in pressure-formability. Furthermore, the close adhesion enhances conduction.

Preferably, the sulfide glass is heated at a temperature equal to or higher than the glass transition point of the sulfide glass to have a portion thereof transitioned to glass ceramic. When a battery is charged/discharged an active material expands and shrinks and powder accordingly provides small mobility which results in glass ceramic having destroyed physical connection. Viscous sulfide glass can reduce or prevent such destruction.

The present invention provides a solid state battery including: a positive electrode composite material layer; a negative electrode composite material layer; and a solid state electrolyte layer including sulfide glass sandwiched between the positive electrode composite material layer and the negative electrode composite material layer and heated. The positive electrode composite material layer includes sulfide glass unheated and a positive electrode active material. The sulfide glass and the positive electrode active material are pressure-formed and in contact with each other. The positive electrode active material's sulfide glass is heated at a temperature equal to or higher than the glass transition point of the sulfide glass to have a portion thereof transitioned to glass ceramic. The negative electrode composite material layer includes sulfide glass and a negative electrode active material. The sulfide glass and the negative electrode active material are pressure-formed and in contact with each other. The negative electrode composite material layer's sulfide glass is heated at a temperature equal to or higher than the glass transition point of the sulfide glass to have a portion thereof transitioned to glass ceramic. The solid state battery thus configured includes sulfide glass having viscosity and excellent in pressure-formability. It can thus closely adhere to an active material surrounding it and thus be excellent in pressure-formability. Furthermore, the close adhesion enhances conduction.

Preferably, the sulfide glass is heated at a temperature equal to or higher than the glass transition point of the sulfide glass and has transitioned to glass ceramic.

The present invention provides a solid state battery including: a positive electrode composite material layer; a negative electrode composite material layer; and a solid state electrolyte layer including sulfide glass sandwiched between the positive electrode composite material layer and the negative electrode composite material layer and heated. The positive electrode composite material layer includes sulfide glass and a positive electrode active material. The sulfide glass and the positive electrode active material are pressure-formed and in contact with each other. The sulfide glass is heated at a temperature equal to or higher than the glass transition point of the sulfide glass to transition to glass ceramic. The negative electrode composite material layer includes sulfide glass and a negative electrode active material. The sulfide glass and the negative electrode active material are pressure-formed and in contact with each other. The sulfide glass is heated at a temperature equal to or higher than the glass transition point of the sulfide glass to transition to glass ceramic.

The present invention provides a solid state battery including: a positive electrode composite material layer; a negative electrode composite material layer; and glass ceramic sandwiched between the positive electrode composite material layer and the negative electrode composite material layer. The positive electrode composite material layer includes sulfide glass and a positive electrode active material. The sulfide glass and the positive electrode active material are pressure-formed and in contact with each other. The negative electrode composite material layer includes sulfide glass and a negative electrode active material. The sulfide glass and the negative electrode active material are pressure-formed and in contact with each other.

The solid state battery thus configured allows viscous sulfide glass to reduce or prevent such destruction of an ion conduction network that is otherwise caused when the battery is charged/discharged, as an active material expands and shrinks.

The present invention in another aspect provides a composite material layer including: a mixture of sulfide glass and glass ceramic; and an active material for one of a positive electrode and a negative electrode. The mixture and the active material are pressure-formed and in contact with each other.

The composite material layer thus configured contains sulfide glass having viscosity and excellent in pressure-formability. It can thus closely adhere to an active material surrounding it and thus be excellent in pressure-formability. Furthermore, the close adhesion enhances conduction.

The present invention in still another aspect provides a solid state battery including: a positive electrode composite material layer; a negative electrode composite material layer; and a solid state electrolyte layer including sulfide glass and glass ceramic sandwiched between the positive electrode composite material layer and the negative electrode composite material layer. The positive electrode composite material layer includes a mixture of sulfide glass and glass ceramic, and a positive electrode active material. The mixture and the positive electrode active material are pressure-formed and in contact with each other. The negative electrode composite material layer includes a mixture of sulfide glass and glass ceramic, and a negative electrode active material. The mixture and the negative electrode active material are pressure-formed and in contact with each other.

The solid state battery thus configured allows viscous sulfide glass to reduce or prevent such destruction of an ion conduction network that is otherwise caused when the battery is charged/discharged, as an active material expands and shrinks.

Preferably, sulfide glass existing at a periphery of the solid state battery has completely transitioned to glass ceramic. This can prevent sulfide glass from externally flowing out when the battery is charged, as expansion and shrinkage are caused. Conduction can thus be ensured.

Preferably, the composite material layer's active material includes at least one selected from the group consisting of $\alpha\text{-Fe}_2\text{O}_3$, $\text{Li}_4\text{Ti}_5\text{O}_{12}$, $\text{LiCoO}_2$, and $\text{LiNi}_{0.5}\text{Mn}_{0.5}\text{O}_2$.

Preferably, the solid state battery's active material includes at least one selected from the group consisting of $\alpha\text{-Fe}_2\text{O}_3$, $\text{Li}_4\text{Ti}_5\text{O}_{12}$, $\text{LiCoO}_2$, and $\text{LiNi}_{0.5}\text{Mn}_{0.5}\text{O}_2$.

The present invention provides a method of producing a composite material layer, including the steps of: preparing a mixture of sulfide glass and one of a positive electrode active material and a negative electrode active material; and pressure-forming the mixture to form a composite material layer of one of a positive electrode and a negative electrode.

Preferably, the step of preparing the mixture includes the step of preparing a mixture containing a conduction additive.

Preferably, the method includes the step of heating the composite material layer at a temperature equal to or higher than the glass transition point of the sulfide glass to leave a portion of the sulfide glass and cause a remainder of the sulfide glass to precipitate glass ceramic.

Preferably, the method includes the step of heating the composite material layer at a temperature equal to or higher than the glass transition point of the sulfide glass to cause the sulfide glass to precipitate glass ceramic.

The present invention provides a method of producing a solid state battery, including the steps of: sandwiching sulfide glass between a positive electrode composite material layer and a negative electrode composite material layer; and heating the positive electrode composite material layer, the sulfide glass and the negative electrode composite material layer at a temperature equal to or higher than the glass transition point of the sulfide glass to cause the sulfide glass to precipitate glass ceramic. The positive electrode composite material layer and the negative electrode composite material layer are produced in any of the above methods.

Preferably in the method of producing the composite material layer the active material includes at least one selected from the group consisting of $\alpha\text{-Fe}_2\text{O}_3$, $\text{Li}_4\text{Ti}_5\text{O}_{12}$, $\text{LiCoO}_2$, and $\text{LiNi}_{0.5}\text{Mn}_{0.5}\text{O}_2$.

Preferably in the method of producing the solid state battery the active material includes at least one selected from the group consisting of $\alpha\text{-Fe}_2\text{O}_3$, $\text{Li}_4\text{Ti}_5\text{O}_{12}$, $\text{LiCoO}_2$, and $\text{LiNi}_{0.5}\text{Mn}_{0.5}\text{O}_2$.

BEST MODES FOR CARRYING OUT THE INVENTION

Hereinafter the present invention in embodiments will be described with reference to the drawings. In the following embodiments, identical or corresponding components are identically denoted and will not be described repeatedly. Furthermore, each embodiment may be combined with another embodiment.

First Embodiment

Figure 1:
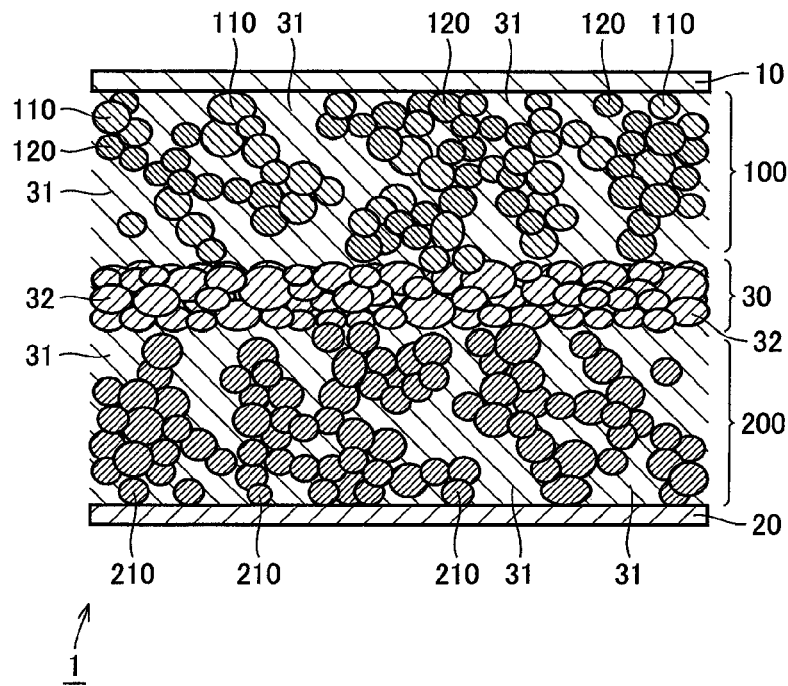
FIG. 1 is a cross section of a battery of the present invention in a first embodiment.

FIG. 1 is a cross section of a battery of the present invention in a first embodiment. With reference to FIG. 1, a solid state battery 1 includes a positive electrode collector 10, a positive electrode composite material layer 100 in contact with positive electrode collector 10, a solid state electrolyte layer 30 in contact with positive electrode composite material layer 100, a negative electrode composite material layer 200 in contact with solid state electrolyte layer 30, and a negative electrode collector 20 in contact with negative electrode composite material layer 200. Positive electrode collector 10 and negative electrode collector 20 are formed of metal such as aluminum, copper, or the like, respectively. Positive electrode composite material layer 100 includes a positive electrode active material 110, a conduction additive 120 arranged adjacent to positive electrode active material 110, and sulfide glass 31 surrounding positive electrode active material 110 and conduction additive 120.

Sulfide glass 31 is obtained by mixing a glass forming material of $SiS_2$, phosphorus pentasulfide ($P_2S_5$), $P_2S_3$ or the like and a glass modifier of lithium sulfide ($Li_2S$) together and heat-melting and then rapidly cooling the mixture. The method by which lithium sulfide ($Li_2S$) constituting sulfide glass 31 is produced may be any method, and any lithium sulfide may be used without particular limitation as long as it has been industrially produced for sale.

The particle size of lithium sulfide is not particularly limited.

Alternatively, sulfide glass 31 may be produced as follows: As a starting material, lithium sulfide and phosphorus pentasulfide or instead a simple substance of phosphorus and a simple substance of sulfur may be mixed together and then mechanically milled and thus vitrified.

For positive electrode active material 110, lithium cobalt oxide, for example, may be used. For conduction additive 120, graphite, for example, may be used.

Solid state electrolyte layer 30 is constituted of glass ceramic 32 serving as a solid state electrolyte. Glass ceramic 32 is obtained by heating sulfide glass. It has higher lithium ion conductivity than sulfide glass.

Negative electrode composite material layer 200 includes a negative electrode active material 210, and sulfide glass 31 surrounding negative electrode active material 210. Negative electrode active material 210 can be carbon.

The provision of conduction additive 120 in positive electrode composite material layer 100 is not mandatory. Further, negative electrode composite material layer 200 may include, although not included in the present embodiment, a conduction additive.

Sulfide glass 31 is in the form of particles and there may appear an interface between adjacent particles of sulfide glass 31. Positive electrode composite material layer 100 includes sulfide glass 31 unheated, and positive electrode active material 110. Sulfide glass 31 and positive electrode active material 110 are pressure-formed and thus in contact with each other. Negative electrode composite material layer 200 includes sulfide glass 31 unheated, and negative electrode active material 210. Sulfide glass 31 and negative electrode active material 210 are pressure-formed and thus in contact with each other. Solid state battery 1 includes positive electrode composite material layer 100, negative electrode composite material layer 200, and solid state electrolyte layer 30 having glass ceramic 32 sandwiched between positive electrode composite material layer 100 and negative electrode composite material layer 200.

Figure 2:
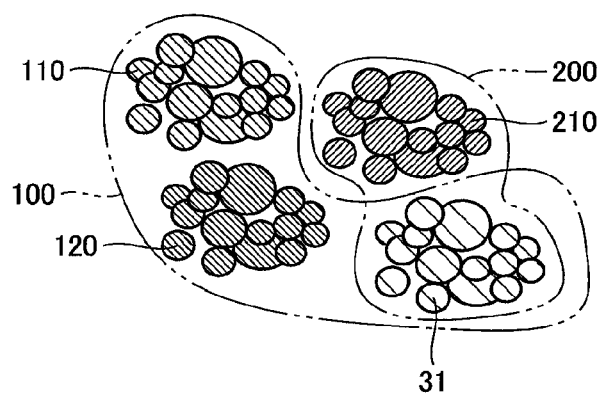
FIG. 2 shows a source material for a positive electrode composite material layer and a negative electrode composite material layer.

The FIG. 1 battery is produced in a method, as will be described hereinafter. FIG. 2 shows a source material for a positive electrode composite material layer and a negative electrode composite material layer. With reference to FIG. 2, initially, materials for configuring the positive electrode composite material layer are prepared. More specifically, positive electrode active material 110, conduction additive 120, and sulfide glass 31 are prepared. Furthermore, materials for configuring negative electrode composite material layer 200 are prepared. More specifically, negative electrode active material 210 and sulfide glass 31 are prepared. Positive electrode active material 110, conduction additive 120, sulfide glass 31, and negative electrode active material 210 are each provided in a form of powder. It can for example be milled powder. Furthermore, the powder is not particularly limited in particle size. Positive electrode active material 110, conduction additive 120, and sulfide glass 31 are sufficiently mixed together and then introduced in a mold and pressure-formed therein to obtain positive electrode composite material layer 100. Furthermore, negative electrode active material 210 and sulfide glass 31 are sufficiently mixed together and then introduced in a mold and pressure-formed therein to obtain negative electrode composite material layer 200.

Figure 3:
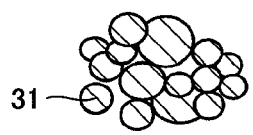
FIG. 3 shows a first step of a method of producing a solid state electrolyte layer.
Figure 4:
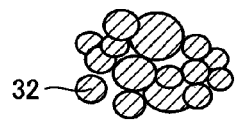
FIG. 4 shows a second step of the method of producing the solid state electrolyte layer.

FIG. 3 shows a first step of a method of producing the solid state electrolyte layer. FIG. 4 shows a second step of the method of producing the solid state electrolyte layer. With reference to FIG. 3, initially, sulfide glass 31 is prepared. Sulfide glass 31 may or may not be identical in composition and equal in particle size to sulfide glass 31 configuring positive electrode composite material layer 100 and negative electrode composite material layer 200.

With reference to FIG. 4, sulfide glass is heated at a temperature equal to or higher than the glass transition point of sulfide glass 31 to precipitate glass ceramic 32. This heat treatment is performed at a temperature for a period of time, which vary depending on the composition of the sulfide glass. For example, if sulfide glass is lithium sulfide $Li_2S$, it can be heated at 150° C. to 500° C.

An example will be described hereinafter. The sulfide glass was obtained for example by processing (mechanical milling) a powdery mixture of $Li_2S$ and $P_2S_5$ at a molar ratio of 80:20 in a planetary ball mill for twenty hours. The glass ceramic was obtained by heating this sulfide glass at a temperature in the vicinity of the glass transition point (i.e., approximately 200° C.) for several hours.

The positive electrode composite material was obtained by mixing $LiCoO_2$, sulfide glass, and a conduction additive (graphite) at a weight ratio of 40:60:4. The negative electrode composite material was obtained by mixing graphite and sulfide glass at a weight ratio of 1:1.

The negative electrode composite material, sulfide glass, and the positive electrode composite material were sequentially introduced into a circular mold of 10 mm in diameter, allowing pressure-forming, followed by applying pressure at 400 MPa to obtain a solid state battery in the form of a pellet.

As a comparative example, a solid state battery having sulfide glass replaced with glass ceramic was provided.

The present example's solid state battery and the comparative example's solid state battery were charged and discharged for 10 cycles at a current density of 64 $\mu A/cm^2$, and thereafter underwent a test, i.e., were charged and discharged for 100 cycles. The batteries' respective dischargeable capacities and resistances before the test were set as a reference, and in comparison with the reference, the batteries' respective dischargeable capacity reduction rates and resistance increase rates after the test were confirmed. As a result, the present example provided a dischargeable capacity reduction rate of 14% and a resistance increase rate of 23%, whereas the comparative example provided a dischargeable capacity reduction rate of 26% and a resistance increase rate of 48%. The present invention thus provides a battery having effectively improved characteristics in longevity.

Note that while in the above description a solid state electrolyte that allows a superionic conductor crystal to be precipitated by heating amorphous glass is configured of those in an unheated, amorphous state and a heated, crystalline state, respectively, combined together, it is not limited in type as long as it is a lithium ion conducting, solid state electrolyte. For example, a portion of the present invention that corresponds to an amorphous portion may be an amorphous solid state electrolyte formed of another material, and a portion of the present invention that corresponds to a crystalline portion may be a crystalline solid state electrolyte formed of another material.

In the first embodiment, a positive electrode active material layer implemented as positive electrode composite material layer 100 and a negative electrode active material layer implemented as negative electrode composite material layer 200 contain an electrolyte implemented as viscous sulfide glass 31. This allows absorption of such expansion and shrinkage of positive electrode active material 110 and negative electrode active material 210 that are caused as the battery is charged and discharged, and can thus prevent destruction of an ion conduction path. Improved characteristics in longevity can thus be achieved.

Second Embodiment

Figure 5:
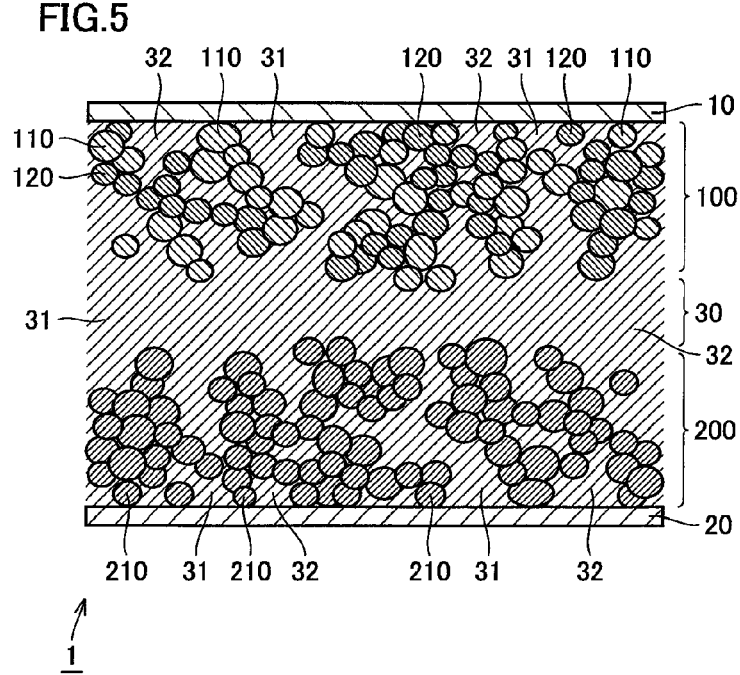
FIG. 5 is a cross section of a battery of the present invention in a second embodiment.

FIG. 5 is a cross section of a battery of the present invention in a second embodiment. With reference to FIG. 5, the second embodiment provides solid state battery 1 different from that of the first embodiment in that positive electrode composite material layer 100 and negative electrode composite material layer 200 contain sulfide glass 31 and glass ceramic 32 mixed together. In the second embodiment, a shape of a battery is first configured with sulfide glass 31 as it is, and the intermediate product is then heated, under a condition, which is adjusted to adjust crystallinity to allow a portion to remain in a glassy state. In other words, in the second embodiment, positive electrode composite material layer 100 has sulfide glass 31 heated at a temperature equal to or higher than the glass transition point of sulfide glass 31 to partially transition to glass ceramic 32. A battery implemented as solid state battery 1 includes positive electrode composite material layer 100, negative electrode composite material layer 200, and solid state electrolyte layer 30 including glass ceramic 32 sandwiched between positive electrode composite material layer 100 and negative electrode composite material layer 200.

In other words, positive electrode composite material layer 100 and negative electrode composite material layer 200 that are configured with a solid state electrolyte of viscous sulfide glass 31 can prevent an ion conduction network from being destroyed as an active material expands and shrinks when the battery is charged and discharged. An improved characteristic in longevity can be achieved.

Figure 6:
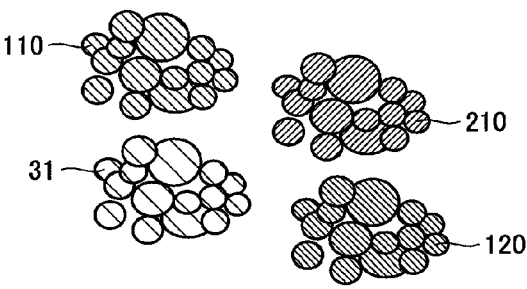
FIG. 6 is a diagram for illustrating a method of producing the battery in the second embodiment, as shown in FIG. 5.
Figure 7:
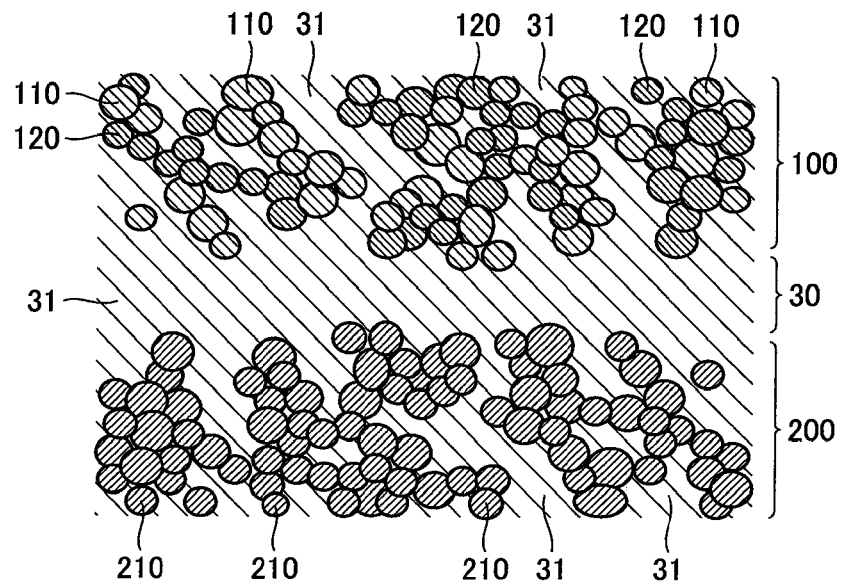
FIG. 7 is a diagram for illustrating the method of producing the battery in the second embodiment, as shown in FIG. 5.

The FIG. 5 battery is produced in a method, as will be described hereinafter. FIG. 6 and FIG. 7 are diagrams for illustrating a method of producing the battery in the second embodiment, as shown in FIG. 5. Initially, with reference to FIG. 6, as starting materials, positive electrode active material 110, negative electrode active material 210, sulfide glass 31 and conduction additive 120 are prepared.

With reference to FIG. 7, positive electrode active material 110, conduction additive 120 and sulfide glass 31 are mixed together and pressure-formed to constitute positive electrode composite material layer 100. Furthermore, negative electrode active material 210 and sulfide glass 31 are mixed together and pressure-formed to constitute negative electrode composite material layer 200. Between positive electrode composite material layer 100 and negative electrode composite material layer 200, sulfide glass 31 is introduced. Positive electrode composite material layer 100, solid state electrolyte layer 30, and negative electrode composite material layer 200 are heated to allow sulfide glass 31 to have a portion having a supertonic conductor crystal precipitated to constitute the glass ceramic shown in FIG. 5. The layers are heated under a condition controlled to allow sulfide glass 31 to partially remain as it is.

This allows the electrolyte to have a portion configured of viscous glass. As the battery is charged/discharged, the active material expands and shrinks. The viscous glass can absorb such expansion and shrinkage, and thus prevent destruction of an ion conduction path. An improved characteristic in longevity can thus be achieved.

An example will be described hereinafter. The sulfide glass was obtained for example by processing (mechanical milling) a powdery mixture of $Li_2S$ and $P_2S_5$ at a molar ratio of 80:20 in a planetary ball mill for twenty hours.

The positive electrode composite material was obtained by mixing $LiCoO_2$, sulfide glass, and a conduction additive (graphite) at a weight ratio of 40:60:4. The negative electrode composite material was obtained by mixing graphite and sulfide glass at a weight ratio of 1:1.

The negative electrode composite material, sulfide glass, and the positive electrode composite material were sequentially introduced into a circular mold of 10 mm in diameter, allowing pressure-forming, followed by applying pressure at 400 MPa to obtain a circular pellet.

The circular pellet was heated for several hours in the vicinity of the glass transition point of sulfide glass (approximately 200° C.). In doing so, it was held for a period of time adjusted in accordance with a rate, as previously obtained, at which the sulfide glass's reaction progresses for that temperature. In this example, although it depends on the sulfide glass ion's ionic conductivity, the amount of the sulfide glass to remain was set at 30%.

As a comparative example, a solid state battery was provided in the following method:

The sulfide glass obtained in the same method as the present example was heated for several hours at a temperature in the vicinity of the glass transition point (200° C.) to obtain glass ceramic.

The positive electrode composite material was obtained by mixing $LiCoO_2$, sulfide glass, and a conduction additive (graphite) at a weight ratio of 40:60:4. The negative electrode composite material was obtained by mixing graphite and sulfide glass at a weight ratio of 1:1.

The negative electrode composite material, sulfide glass, and the positive electrode composite material were sequentially introduced into a circular mold of 10 mm in diameter, allowing pressure-forming, followed by applying pressure at 400 MPa to obtain a circular pellet.

The present example's solid state battery and the comparative example's solid state battery were charged and discharged for 10 cycles at a current density of 64 $\mu A/cm^2$, and thereafter underwent a test, i.e., were charged and discharged for 100 cycles. The batteries' respective dischargeable capacities and resistances before the test were set as a reference, and in comparison with the reference, the batteries' respective dischargeable capacity reduction rates and resistance increase rates after the test were confirmed. As a result, the present example provided a dischargeable capacity reduction rate of 14% and a resistance increase rate of 23%, whereas the comparative example provided a dischargeable capacity reduction rate of 26% and a resistance increase rate of 48%. The present invention thus provides a battery having effectively improved characteristics in longevity.

Third Embodiment

Figure 8:
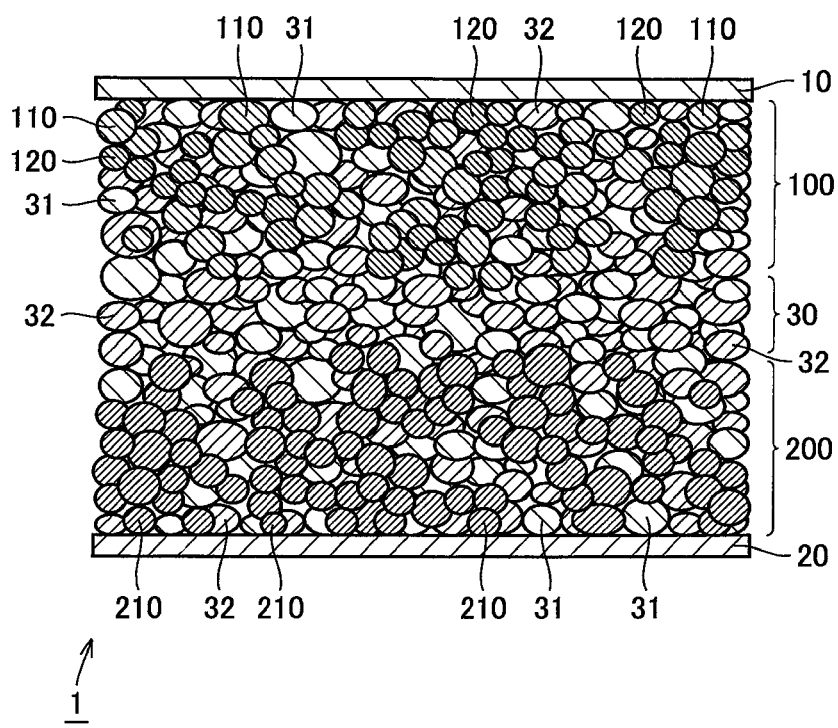
FIG. 8 is a cross section of a battery of the present invention in a third embodiment.

FIG. 8 is a cross section of a battery of the present invention in a third embodiment. With reference to FIG. 8, the third embodiment provides solid state battery 1 different from that of the second embodiment in that a solid state electrolyte is implemented by sulfide glass 31 and glass ceramic 32 that are sintered before they are pressure-formed. More specifically, the second embodiment provides pressure-forming followed by sintering to provide glass ceramic 32, whereas the third embodiment provides sintering followed by pressure-forming to configure solid state battery 1.

Figure 9:
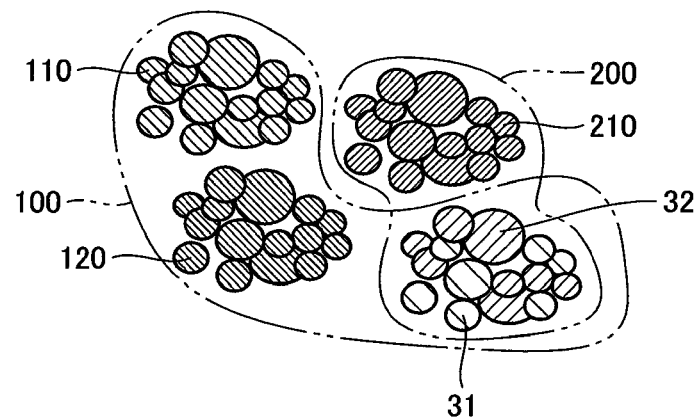
FIG. 9 is a diagram for illustrating a method of producing the battery in the third embodiment, as shown in FIG. 8.

FIG. 9 is a diagram for illustrating a method of producing the battery in the third embodiment, as shown in FIG. 8. With reference to FIG. 9, as starting materials, positive electrode active material 110, conduction additive 120, glass ceramic 32, sulfide glass 31, and negative electrode active material 210 are prepared. Positive electrode active material 110, conduction additive 120, sulfide glass 31 and glass ceramic 32 configure positive electrode composite material layer 100. Negative electrode active material 210, sulfide glass 31 and glass ceramic 32 configure negative electrode composite material layer 200. Glass ceramic 32 is obtained by heating sulfide glass 31, and sulfide glass 31 heated at a temperature equal to or higher than its glass transition point precipitates glass ceramic 32. Glass ceramic 32 is a superionic conductor. Positive electrode active material 110, conduction additive 120, sulfide glass 31 and glass ceramic 32 are mixed together and then pressure-formed to form positive electrode composite material layer 100. Negative electrode active material 210, sulfide glass 31 and glass ceramic 32 are mixed together and then pressure-formed to form negative electrode composite material layer 200. Sulfide glass 31 and glass ceramic 32 are pressure-formed to form solid state electrolyte layer 30. The FIG. 8 solid state battery thus completes.

Solid state battery 1 according to the third embodiment thus configured is also as effective as that according to the second embodiment.

An example will be described hereinafter. The sulfide glass was obtained for example by processing (mechanical milling) a powdery mixture of $Li_2S$ and $P_2S_5$ at a molar ratio of 80:20 in a planetary ball mill for twenty hours. The glass ceramic was obtained by heating this sulfide glass at a temperature in the vicinity of the glass transition point (i.e., approximately 200° C.) for several hours.

A mixture of sulfide glass and glass ceramic (hereinafter referred to as "the mixture") was obtained by mixing the aforementioned sulfide glass and glass ceramic at a weight ratio of 3:7.

The positive electrode composite material was obtained by mixing $LiCoO_2$, the mixture of the sulfide glass and the ceramic, and a conduction additive (graphite) at a weight ratio of 40:60:4. The negative electrode composite material was obtained by mixing graphite and the mixture of the sulfide glass and the ceramic at a weight ratio of 1:1.

The negative electrode composite material, sulfide glass, and the positive electrode composite material were sequentially introduced into a circular mold of 10 mm in diameter, allowing pressure-forming, followed by applying pressure at 400 MPa to obtain a circular pellet.

As a comparative example, a solid state battery was provided in the following method:

The sulfide glass obtained in the same method as the present example was heated for several hours at a temperature in the vicinity of the glass transition point (200° C.) to obtain glass ceramic.

The positive electrode composite material was obtained by mixing $LiCoO_2$, glass ceramic, and a conduction additive (graphite) at a weight ratio of 40:60:4. The negative electrode composite material was obtained by mixing graphite and glass ceramic at a weight ratio of 1:1.

The negative electrode composite material, glass ceramic, and the positive electrode composite material were sequentially introduced into a circular mold of 10 mm in diameter, allowing pressure-forming, followed by applying pressure at 400 MPa to obtain a circular pellet.

The present example's solid state battery and the comparative example's solid state battery were charged and discharged for 10 cycles at a current density of 64 $\mu A/cm^2$, and thereafter underwent a test, i.e., were charged and discharged for 100 cycles. The batteries' respective dischargeable capacities and resistances before the test were set as a reference, and in comparison with the reference, the batteries' respective dischargeable capacity reduction rates and resistance increase rates after the test were confirmed. As a result, the present example provided a dischargeable capacity reduction rate of 14% and a resistance increase rate of 23%, whereas the comparative example provided a dischargeable capacity reduction rate of 26% and a resistance increase rate of 48%. The present invention thus provides a battery having effectively improved characteristics in longevity.

Note that while in the above description a solid state electrolyte that allows a supertonic conductor crystal to be precipitated by heating amorphous glass is configured of those in an unheated, amorphous state and a heated, crystalline state, respectively, combined together, it is not limited in type as long as it is a lithium ion conducting, solid state electrolyte. For example, a portion of the present invention that corresponds to an amorphous portion may be an amorphous solid state electrolyte formed of another material, and a portion of the present invention that corresponds to a crystalline portion may be a crystalline solid state electrolyte formed of another material.

Furthermore, while the present example employs a mixture of sulfide glass and glass ceramic as a solid state electrolyte, the sulfide glass may be held heated for a period of time adjusted in accordance with a rate, as previously obtained, at which the sulfide glass's reaction progresses at the heating temperature, to allow the sulfide glass to partially remain unreacted to obtain the mixture.

Fourth Embodiment

Figure 10:
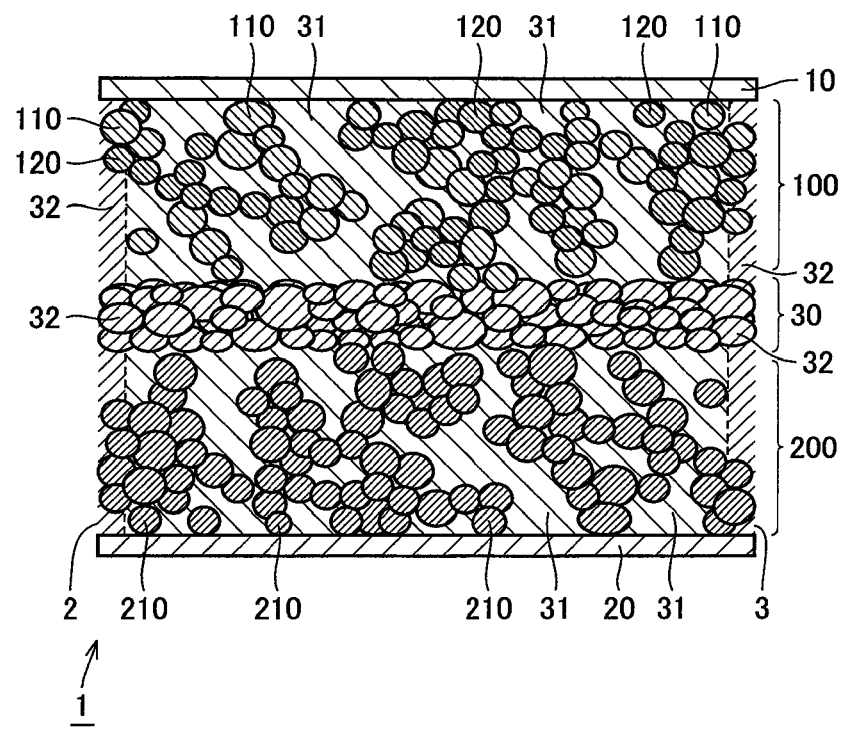
FIG. 10 is a cross section of a battery of the present invention in a fourth embodiment.

FIG. 10 is a cross section of a battery of the present invention in a fourth embodiment. With reference to FIG. 10, the present invention in the fourth embodiment provides solid state battery 1 different from the battery of the first embodiment in that the former has opposite ends 2, 3 with glass ceramic 32 precipitated. More specifically, solid state battery 1 has only a periphery thereof heated at a temperature equal to or higher than the glass transition point to precipitate glass ceramic 32 at the battery's periphery, or opposite ends 2, 3. As an active material is mixed with sulfide glass serving as a solid state electrolyte configuring positive electrode composite material layer 100, negative electrode composite material layer 200, and, for some case, solid state electrolyte layer 30, the active material repeats expansion and shrinkage with viscous sulfide glass as the battery is charged/discharged. This contributes to destruction of an ion conduction network. The battery can prevent such destruction and provide an improved characteristic in longevity. Furthermore, the battery thus configured that has only a periphery thereof heated to be completely glass ceramic can obtain a further improved characteristic in longevity. More specifically, when a solid state electrolyte contains sulfide glass 31, solid state battery 1 has only a periphery thereof heated to be glass ceramic. This glass ceramic 32 does not have flowability, and can thus prevent sulfide glass 31 from flowing out as solid state battery 1 has an internal pressure increasing as the battery is charged/discharged.

Figure 11:
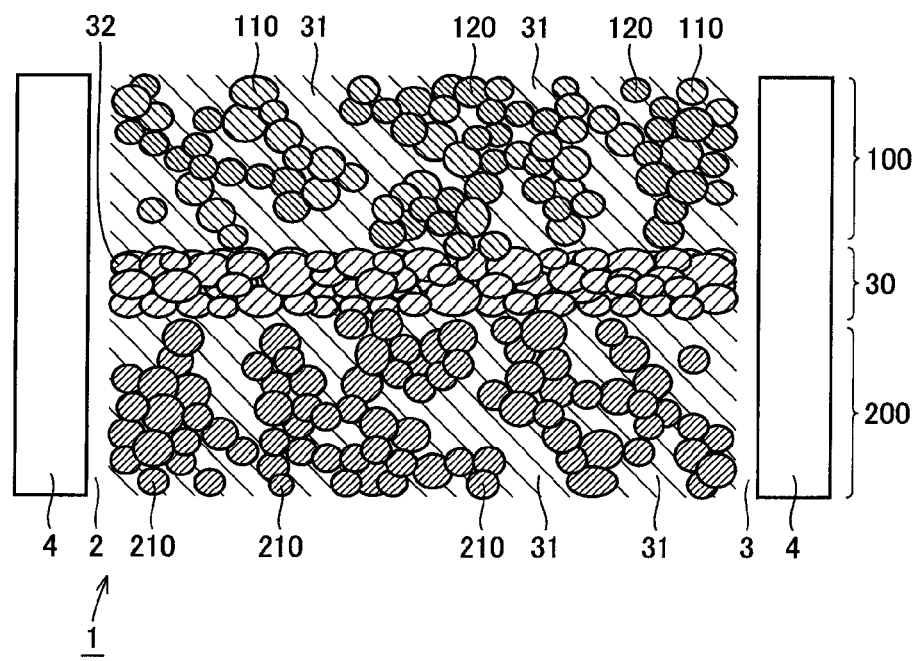
FIG. 11 is a diagram for illustrating a method of producing the battery in the fourth embodiment, as shown in FIG. 10.

FIG. 11 is a diagram for illustrating a method of producing the battery in the fourth embodiment, as shown in FIG. 10. Initially, a method similar to that employed in the first embodiment is employed to produce solid state battery 1. Subsequently, a heater 4 is brought into contact with solid state battery 1 at opposite ends 2, 3 to heat the opposite ends to a temperature equal to or higher than the glass transition point. This precipitates glass ceramic 32 at the periphery shown in FIG. 10. Note that while this embodiment indicates by way of example the first embodiment's battery with a periphery of glass ceramic, the second or third embodiment's solid state battery 1 may also have a periphery of glass ceramic.

A battery according to the fourth embodiment thus configured is also as effective as that according to the first embodiment.

An example will be described hereinafter. The sulfide glass was obtained for example by processing (mechanical milling) a powdery mixture of $Li_2S$ and $P_2S_5$ at a molar ratio of 80:20 in a planetary ball mill for twenty hours. The glass ceramic was obtained by heating this sulfide glass at a temperature in the vicinity of the glass transition point (i.e., approximately 200° C.) for several hours.

The positive electrode composite material was obtained by mixing $LiCoO_2$, sulfide glass, and a conduction additive (graphite) at a weight ratio of 40:60:4. The negative electrode composite material was obtained by mixing graphite and sulfide glass at a weight ratio of 1:1.

The negative electrode composite material, sulfide glass, and the positive electrode composite material were sequentially introduced into a circular mold of 10 mm in diameter, allowing pressure-forming, followed by applying pressure at 400 MPa to obtain a solid state battery in the form of a pellet.

This solid state battery had only a periphery thereof placed in a circular mold having a diameter of 10 mm and adjustable in temperature only at a periphery, and was thus heated to have the periphery heated to a temperature slightly higher than that in the vicinity of the glass transition point (i.e., to approximately 220° C.). The battery was heated for a period of time adjusted depending on a region that becomes glass ceramic in consideration of the conduction of heat into the battery and the sulfide glass's reaction progressing rate at the heating temperature, as obtained previously. In the present example the battery was heated for several minutes so that a region of approximately 1 to 2 mm as seen from a peripheral edge toward the center became glass ceramic.

As a comparative example, a solid state battery was provided in the following method:

The sulfide glass obtained in the same method as the present example was heated for several hours at a temperature in the vicinity of the glass transition point (200° C.) to obtain glass ceramic.

The positive electrode composite material was obtained by mixing $LiCoO_2$, sulfide glass, and a conduction additive (graphite) at a weight ratio of 40:60:4. The negative electrode composite material was obtained by mixing graphite and sulfide glass at a weight ratio of 1:1.

The negative electrode composite material, sulfide glass, and the positive electrode composite material were sequentially introduced into a circular mold of 10 mm in diameter, allowing pressure-forming, followed by applying pressure at 400 MPa to obtain a solid state battery in the form of a pellet.

The present example's solid state battery and the comparative example's solid state battery were charged and discharged for 10 cycles at a current density of 64 $\mu A/cm^2$, and thereafter underwent a test, i.e., were charged and discharged for 100 cycles. The batteries' respective dischargeable capacities and resistances before the test were set as a reference, and in comparison with the reference, the batteries' respective dischargeable capacity reduction rates and resistance increase rates after the test were confirmed. As a result, the present example provided a dischargeable capacity reduction rate of 10% and a resistance increase rate of 19%, whereas the comparative example provided a dischargeable capacity reduction rate of 14% and a resistance increase rate of 23%. The present invention thus provides a battery having effectively improved characteristics in longevity.

Fifth Embodiment

Figure 12:
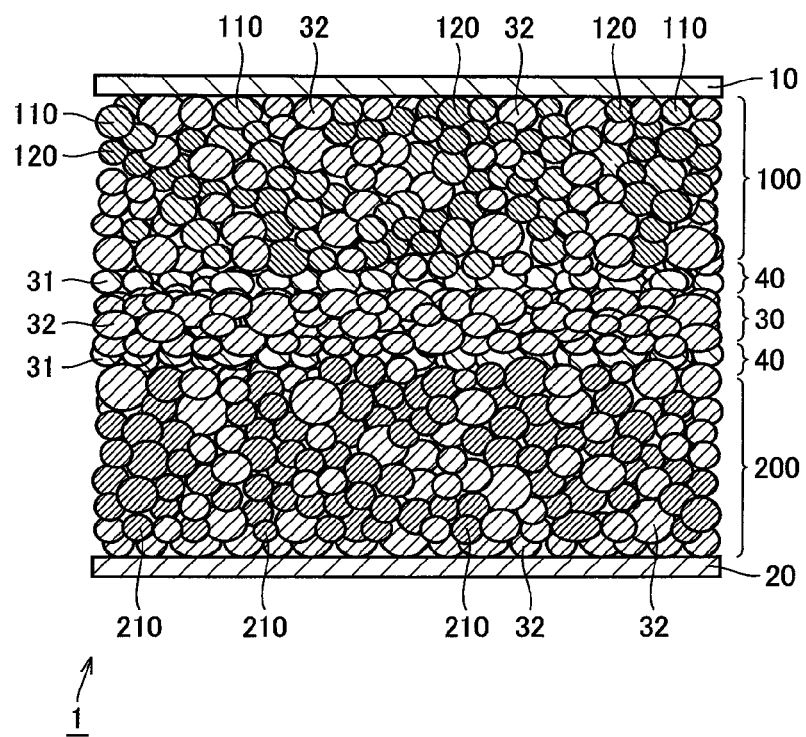
FIG. 12 is a cross section of a battery of the present invention in a fifth embodiment.

FIG. 12 is a cross section of a battery of the present invention in a fifth embodiment. With reference to FIG. 12, the fifth embodiment provides solid state battery 1 different form that of the first embodiment in that between solid state electrolyte layer 30 and positive electrode composite material layer 100 a sulfide glass layer 40 is provided and between solid state electrolyte layer 30 and negative electrode composite material layer 200 sulfide glass layer 40 is provided. Note that the battery according to the first embodiment may be provided with sulfide glass layer 40.

While solid state electrolyte layer 30 in this embodiment is configured of glass ceramic, glass ceramic 32 may have a portion with sulfide glass 31 mixed therein.

While positive electrode composite material layer 100 contains a solid state electrolyte of glass ceramic 32, glass ceramic 32 may have a portion of sulfide glass 31. While negative electrode composite material layer 200 contains a solid state electrolyte of glass ceramic 32, glass ceramic 32 may have a portion of sulfide glass 31.

In other words, sulfide glass layer 40 shown in FIG. 12 is applicable to any batteries of the first to fourth embodiments. Furthermore, while solid state electrolyte layer 30 has both ends provided with sulfide glass layer 40, solid state electrolyte layer 30 may have only one end thereof provided with sulfide glass layer 40.

Figure 13:
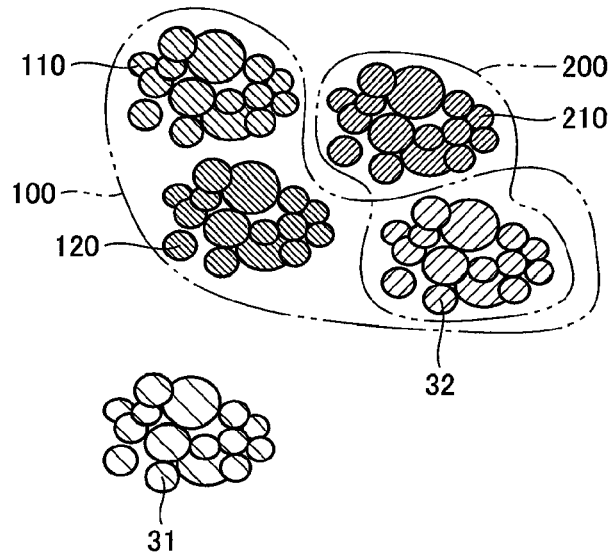
FIG. 13 is a diagram for illustrating a method of producing the battery in the fifth embodiment as shown in FIG. 12.
Figure 14:
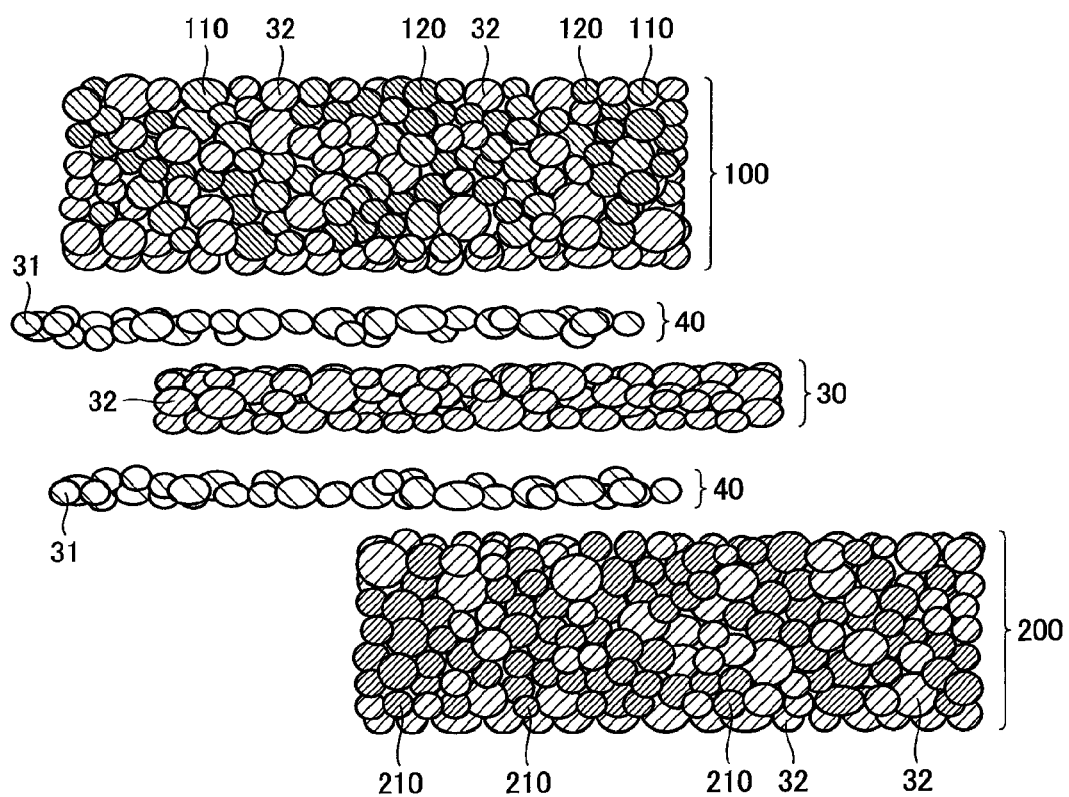
FIG. 14 is a diagram for illustrating the method of producing the battery in the fifth embodiment as shown in FIG. 12.

The FIG. 12 battery is produced in a method, as will be described hereinafter. FIG. 13 and FIG. 14 are diagrams for illustrating a method of producing the battery in the fifth embodiment as shown in FIG. 12. Initially, with reference to FIG. 13, positive electrode active material 110, conduction additive 120, glass ceramic 32, and negative electrode active material 210 are prepared. Positive electrode active material 110, conduction additive 120, and glass ceramic 32 configure positive electrode composite material layer 100, and negative electrode active material 210 and glass ceramic 32 configure negative electrode composite material layer 200.

Furthermore, sulfide glass 31 is prepared for a sulfide glass layer.

With reference to FIG. 14, positive electrode active material 110, conduction additive 120 and glass ceramic 32 are mixed together and pressure-formed to form positive electrode composite material layer 100. Furthermore, sulfide glass 31 is pressure-formed to form sulfide glass layer 40. Glass ceramic 32 is pressure-formed. Negative electrode active material 210 and glass ceramic 32 are pressure-formed to form negative electrode composite material layer 200.

Negative electrode composite material layer 200, sulfide glass layer 40, solid state electrolyte layer 30, and positive electrode composite material layer 100 are pressure-formed to configure the FIG. 12 battery.

The battery thus configured, having positive electrode composite material layer 100 and solid state electrolyte layer 30 with sulfide glass layer 40 interposed, improves contact resistance of positive electrode composite material layer 100 and solid state electrolyte layer 30. Furthermore, the battery thus configured, having negative electrode composite material layer 200 and solid state electrolyte layer 30 with sulfide glass layer 40 interposed, improves contact resistance of negative electrode composite material layer 200 and solid state electrolyte layer 30. This allows the battery to provide an improved output. If a production method is adopted that employs positive electrode composite material layer 100, negative electrode composite material layer 200, and solid state electrolyte layer 30 that are separately configured to configure a battery, the battery can be prevented from being increased in resistance.

An example will be described hereinafter. The sulfide glass was obtained for example by processing (mechanical milling) a powdery mixture of $Li_2S$ and $P_2S_5$ at a molar ratio of 80:20 in a planetary ball mill for twenty hours. The glass ceramic was obtained by heating this sulfide glass at a temperature in the vicinity of the glass transition point (i.e., approximately 200° C.) for several hours.

The positive electrode composite material was obtained by mixing $LiCoO_2$, glass ceramic, and a conduction additive (graphite) at a weight ratio of 40:60:4, and introducing the mixture into a circular mold of 10 mm in diameter, allowing pressure-forming, followed by applying pressure at 400 MPa to obtain a circular pellet. The negative electrode composite material was obtained by mixing graphite and sulfide glass at a weight ratio of 1:1, and introducing the mixture into a circular mold of 10 mm in diameter, allowing pressure-forming, followed by applying pressure at 400 MPa to obtain a circular pellet.

A glass ceramic layer was also introduced into a circular mold of 10 mm in diameter, allowing pressure-forming, followed by applying pressure at 400 MPa to obtain a circular pellet.

The negative electrode composite material layer was placed in the circular mold of 10 mm in diameter, allowing pressure-forming. Thereon, sulfide glass was sprayed in an amount of 1/10 of that of the above solid state electrolyte. Thereon, the glass ceramic layer was deposited. Thereon, sulfide glass was sprayed in an amount of 1/10 of that of the above solid state electrolyte. Thereon, the positive electrode composite material layer was deposited. The intermediate product was then subjected to a pressure of 400 MPa to provide a solid state battery in the form of a pellet.

As a comparative example, a solid state battery was produced in the same method as the above example except that sulfide glass was not sprayed.

The present example's solid state battery and the comparative example's solid state battery were charged and discharged for 10 cycles at a current density of 64 $\mu A/cm^2$, and thereafter compared in internal resistance. With the comparative example serving as a reference, it has been confirmed that the present example provides an 18% reduction in resistance.

Note that while in the above description a solid state electrolyte that allows a superionic conductor crystal to be precipitated by heating amorphous glass is configured of those in an unheated, amorphous state and a heated, crystalline state, respectively, combined together, it is not limited in type as long as it is a lithium ion conducting, solid state electrolyte. For example, a portion of the present invention that corresponds to an amorphous portion may be an amorphous solid state electrolyte formed of another material, and a portion of the present invention that corresponds to a crystalline portion may be a crystalline solid state electrolyte formed of another material.

Sixth Embodiment

Figure 15:
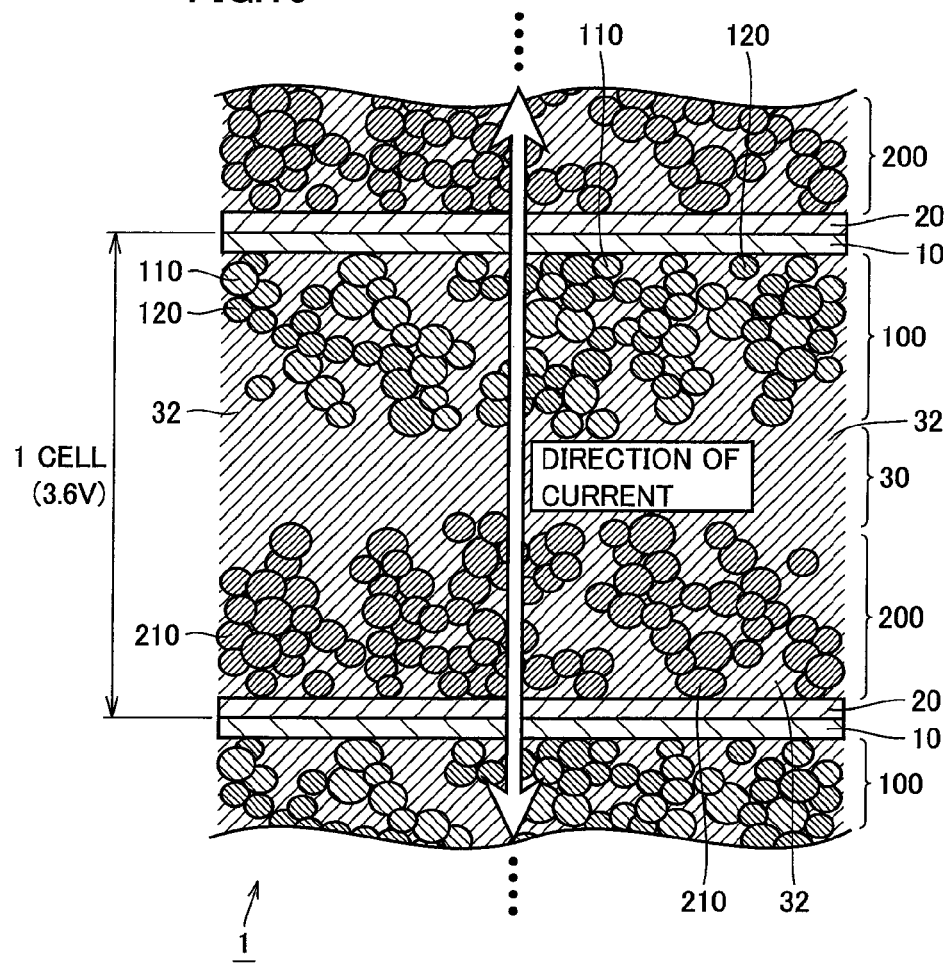
FIG. 15 is a cross section of a battery of the present invention in a sixth embodiment.

FIG. 15 is a cross section of a battery of the present invention in a sixth embodiment. With reference to FIG. 15, the sixth embodiment provides a battery different from that of the first embodiment in that a plurality of cells are stacked in layers and thus connected in series. Each cell has electromotive force of 3.6 V. This electromotive force is variable depending on a material configuring positive electrode active material 110 and negative electrode active material 210.

Furthermore, the number of the layers that are stacked can be determined by the value of the voltage that the battery is required to provide and the value of the electromotive force of a single cell. In FIG. 15, a single cell is configured from negative electrode collector 20 through to positive electrode collector 10, and the cell is provided with positive electrode composite material layer 100, solid state electrolyte layer 30, and negative electrode composite material layer 200. Adjacent cells have negative electrode collector 20 and positive electrode collector 10, respectively, in contact with each other to allow a plurality of cells to be connected in series.

Positive electrode composite material layer 100 has positive electrode active material 110, conduction additive 120 and glass ceramic 32. Solid state electrolyte layer 30 has glass ceramic 32. Negative electrode composite material layer 200 has negative electrode active material 210 and glass ceramic 32.

Figure 16:
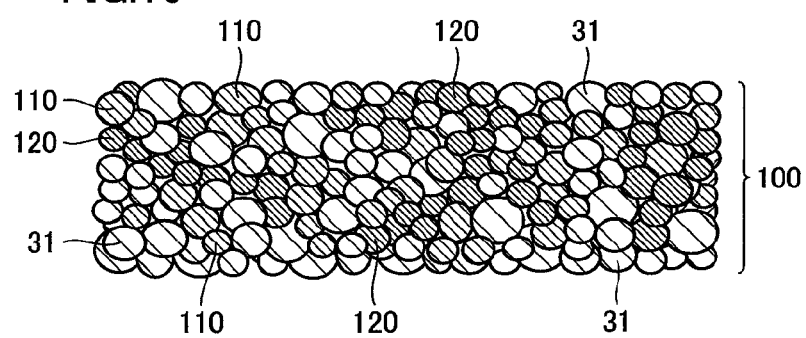
FIG. 16 is a diagram for illustrating a method of producing a positive electrode composite material layer.
Figure 17:
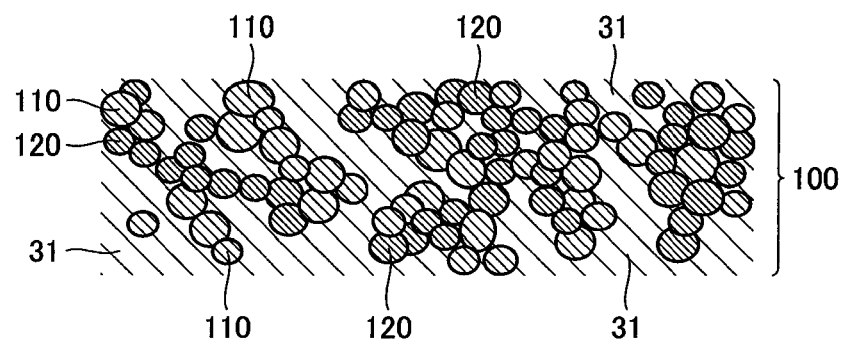
FIG. 17 is a diagram for illustrating the method of producing the positive electrode composite material layer.
Figure 18:
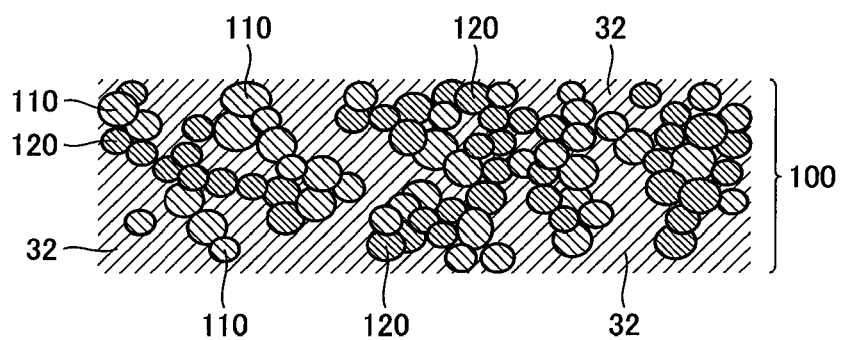
FIG. 18 is a diagram for illustrating the method of producing the positive electrode composite material layer.

The FIG. 15 battery is produced in a method, as will be described hereinafter. FIG. 16 to FIG. 18 are diagrams for illustrating a method of producing a positive electrode composite material layer. With reference to FIG. 16, initially, source materials for the positive electrode composite material layer are prepared. More specifically, sulfide glass 31, positive electrode active material 110 and conduction additive 120 are prepared. They are mixed together to provide a mixture.

With reference to FIG. 17, pressure is applied to the mixture to form a composite body of positive electrode active material 110 and sulfide glass 31. The composite body has sulfide glass 31 and positive electrode active material 110 and conduction additive 120 in close contact with each other.

With reference to FIG. 18, the composite body produced in the aforementioned step is heated at a temperature equal to or higher than the glass transition point of sulfide glass 31 to precipitate glass ceramic 32. The glass ceramic is a superionic conductor layer.

Figure 19:
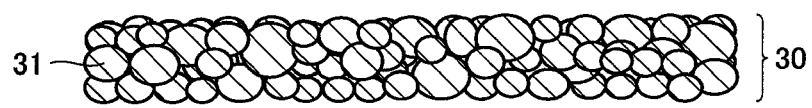
FIG. 19 is a diagram for illustrating a method of producing a solid state electrolyte layer.
Figure 20:
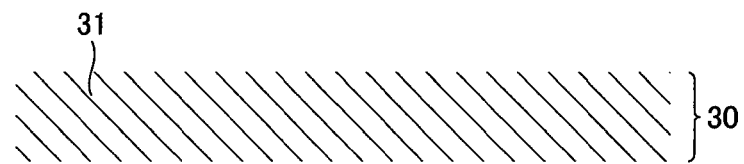
FIG. 20 is a diagram for illustrating the method of producing the solid state electrolyte layer.
Figure 21:
FIG. 21 is a diagram for illustrating the method of producing the solid state electrolyte layer.

FIG. 19 to FIG. 21 are diagrams for illustrating a method of producing a solid state electrolyte layer. With reference to FIG. 19, initially, sulfide glass 31 configuring the solid state electrolyte layer is prepared.

With reference to FIG. 20, pressure is applied to sulfide glass 31. Sulfide glass 31 has viscosity. Accordingly, as pressure is applied to sulfide glass 31, it is fluidized and thus increased in density.

With reference to FIG. 21, the sulfide glass increased in density is heated at a temperature equal to or higher than its glass transition point to precipitate glass ceramic 32.

Figure 22:
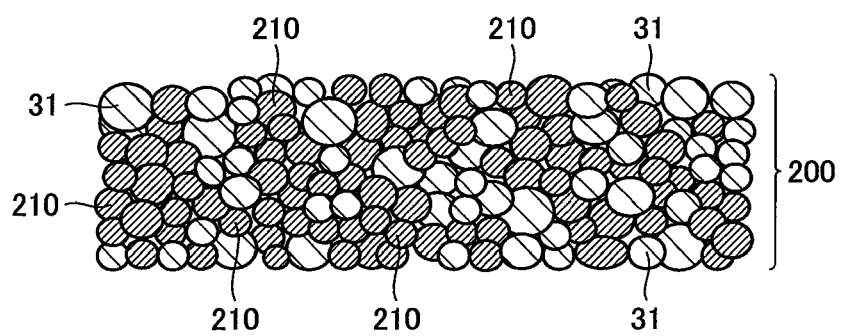
FIG. 22 is a diagram for illustrating a method of producing a negative electrode composite material layer.
Figure 23:
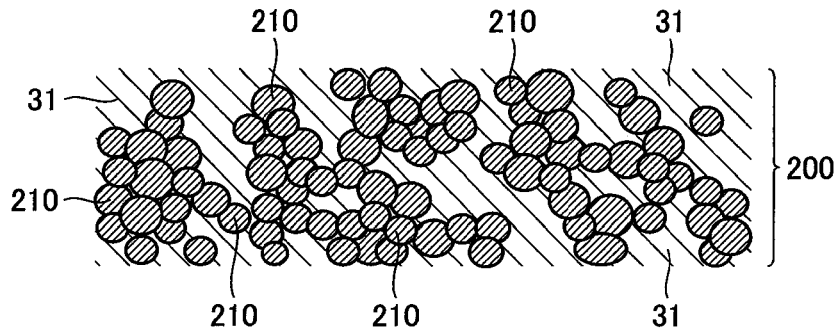
FIG. 23 is a diagram for illustrating the method of producing the negative electrode composite material layer.
Figure 24:
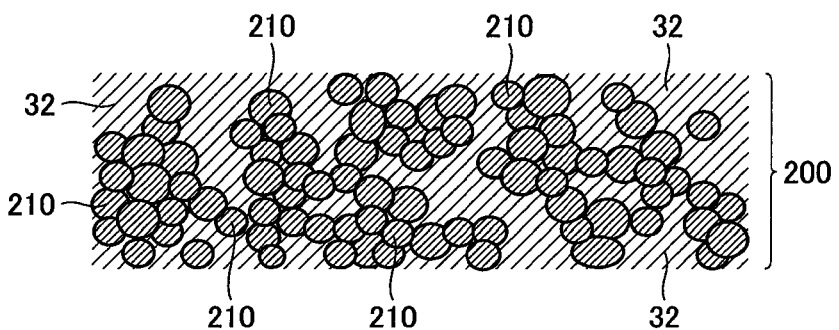
FIG. 24 is a diagram for illustrating the method of producing the negative electrode composite material layer.

FIG. 22 to FIG. 24 are diagrams for illustrating a method of producing a negative electrode composite material layer. With reference to FIG. 22, negative electrode active material 210 and sulfide glass 31 configuring negative electrode composite material layer 200 are mixed together to provide a mixture thereof.

With reference to FIG. 23, pressure is applied to the mixture. Sulfide glass 31 has viscosity. Accordingly, as pressure is applied thereto, it is fluidized and thus increased in density. A composite body of negative electrode active material 210 and sulfide glass 31 is thus formed.

With reference to FIG. 24, the composite body is heated, at a temperature equal to or higher than the glass transition point of sulfide glass 31, to precipitate glass ceramic 32.

Positive electrode composite material layer 100, solid state electrolyte layer 30 and negative electrode composite material layer 200 thus produced are stacked in layers and pressure is applied thereto to produce a single cell of solid state battery 1 shown in FIG. 15. A plurality of such cells are produced and their respective positive electrode collectors 10 and negative electrode collectors 20 are connected together to produce the FIG. 15 solid state battery 1.

The battery according to the sixth embodiment thus configured is also as effective as that according to the first embodiment.

Seventh Embodiment

Figure 25:
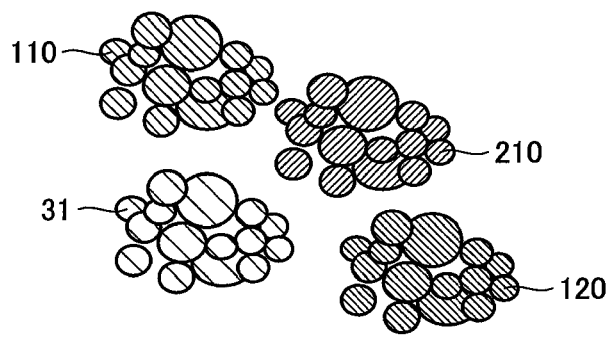
FIG. 25 is a diagram for illustrating another method of producing the battery shown in FIG. 15.
Figure 26:
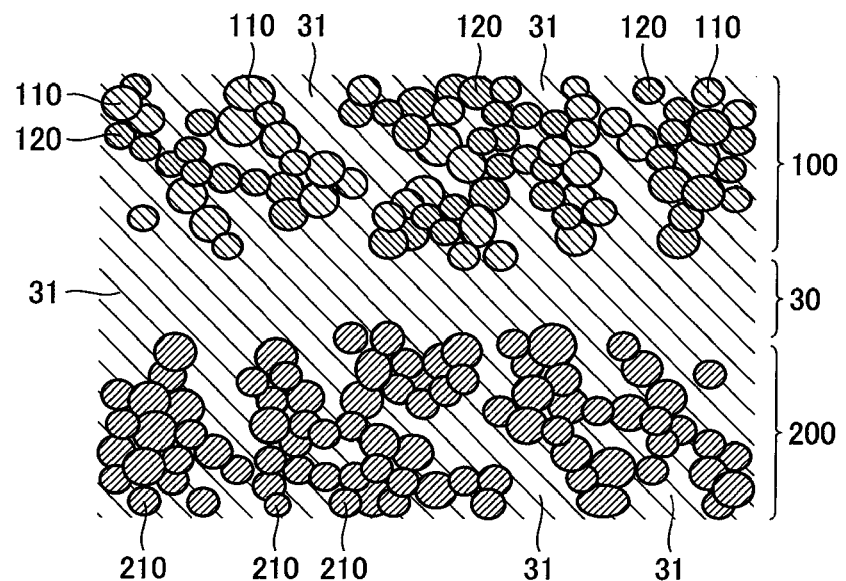
FIG. 26 is a diagram for illustrating the other method of producing the battery shown in FIG. 15.
Figure 27:
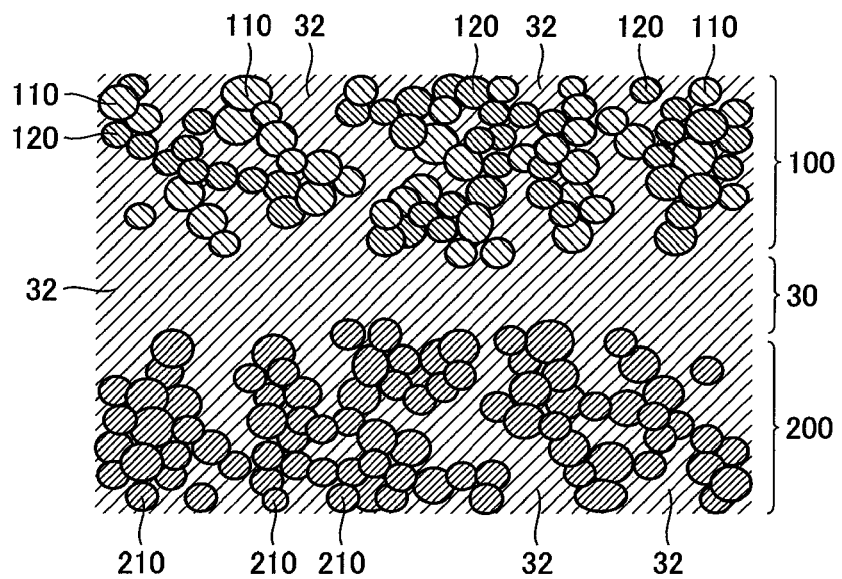
FIG. 27 is a diagram for illustrating the other method of producing the battery shown in FIG. 15.

FIG. 25 to FIG. 27 are diagrams for illustrating another method of producing the battery shown in FIG. 15. With reference to FIG. 25, initially, as source materials, positive electrode active material 110, negative electrode active material 210, conduction additive 120, and sulfide glass 31 unheated are prepared.

With reference to FIG. 26, positive electrode active material 110, sulfide glass 31, negative electrode active material 210 and conduction additive 120 are mixed together and pressure-formed to provide positive electrode composite material layer 100, solid state electrolyte layer 30 and negative electrode composite material layer 200, as shown in FIG. 26. Positive electrode composite material layer 100 contains positive electrode active material 110, conduction additive 120 and sulfide glass 31. Solid state electrolyte layer 30 contains sulfide glass 31. Negative electrode composite material layer 200 contains negative electrode active material 210 and sulfide glass 31.

With reference to FIG. 27, a mixture produced in the above method is heated, at a temperature equal to or higher than the glass transition point of sulfide glass 31, to precipitate glass ceramic 32. Solid state battery 1 can thus be configured.

Eighth Embodiment

In an eighth embodiment when in the second and fourth embodiments a positive electrode composite material layer and a negative electrode composite material layer (with an active material and a solid state electrolyte in contact with each other) are heated to be glass ceramic, $\alpha$-$Fe_2O_3$, $Li_4Ti_5O_{12}$, $LiCoO_2$, or $LiNi_{0.5}Mn_{0.5}O_2$ is used as the active material.

The positive electrode active material and the negative electrode active material can be provided by $\alpha$-$Fe_2O_3$, the negative electrode active material can be provided by $Li_4Ti_5O_{12}$, and the positive electrode active material can be provided by $LiCoO_2$ and $LiNi_{0.5}Mn_{0.5}O_2$.

The sulfide glass was obtained for example by processing (mechanical milling) a powdery mixture of $Li_2S$ and $P_2S_5$ at a molar ratio of 80:20 in a planetary ball mill for 24 hours.

The active material composite material was obtained by mixing $Li_4TiO_{12}$ and sulfide glass at a weight ratio of 40:60.

The active material composite material was introduced into a circular mold of 10 mm in diameter, allowing pressure-forming, followed by applying pressure at 10 MPa and heating to obtain a circular pellet.

The circular pellet was heated for several hours in the vicinity of the glass transition point of sulfide glass (approximately 200° C.). In doing so, it was held for a period of time adjusted in accordance with a rate, as previously obtained, at which the sulfide glass's reaction progresses for that temperature. In this example, although it depends on sulfide glass's ionic conductivity, the amount of the sulfide glass to remain was set at 10%.

As a comparative example, a configuration similar to the above with the active material replaced with $LiFePO_4$ was produced.

Figure 28:
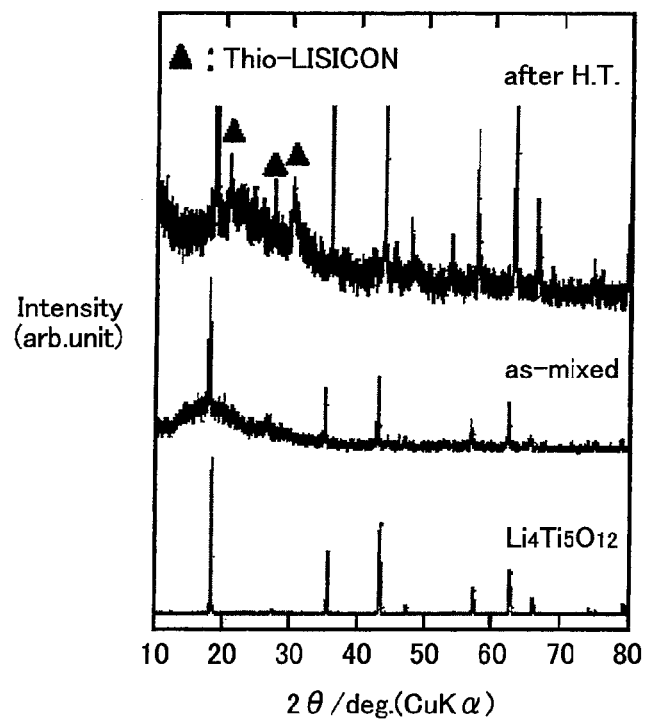
FIG. 28 represents $\text{Li}_4\text{TiO}_{12}$ alone, $\text{Li}_4\text{TiO}_{12}$ mixed with a solid state electrolyte, and thus heated, as represented in x ray diffraction patterns, respectively.
Figure 29:
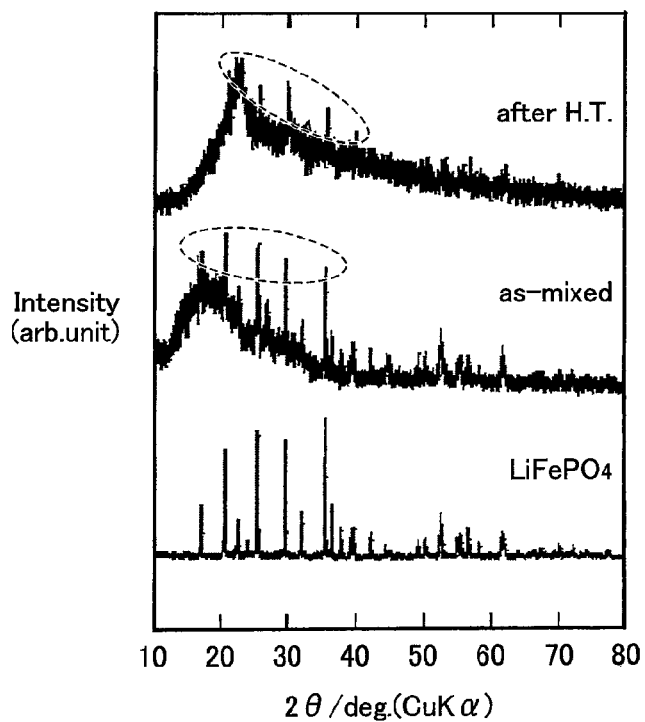
FIG. 29 represents $\text{LiFePO}_4$ alone, $\text{LiFePO}_4$ mixed with a solid state electrolyte, and thus heated, as represented in x ray diffraction patterns, respectively.
Figure 30:
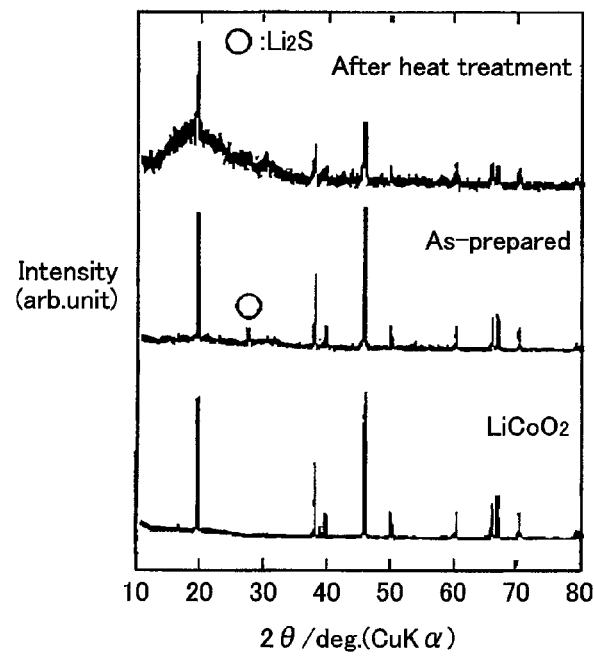
FIG. 30 represents $\text{LiCoO}_2$ alone, $\text{LiCoO}_2$ mixed with a solid state electrolyte, and thus heated, as represented in x ray diffraction patterns, respectively.
Figure 31:
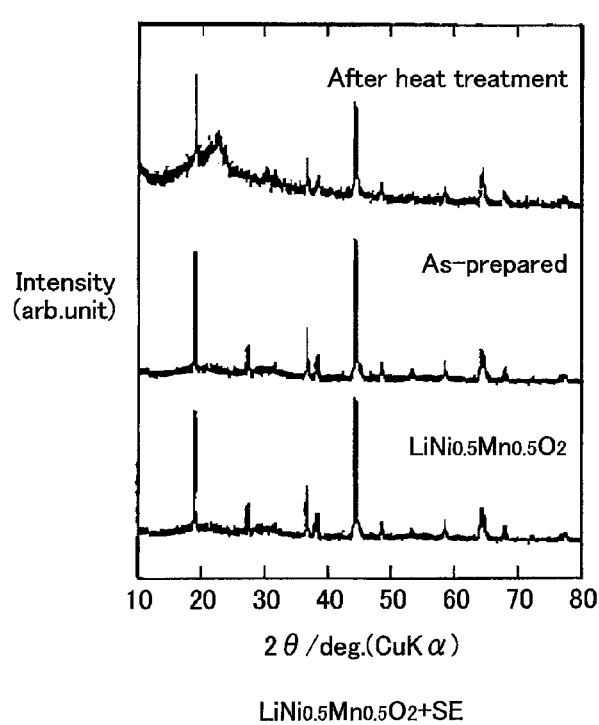
FIG. 31 represents $LiNi_{0.5}Mn_{0.5}O_2$ alone, $LiNi_{0.5}Mn_{0.5}O_2$ mixed with a solid state electrolyte, and thus heated, as represented in x ray diffraction patterns, respectively.
Figure 32:
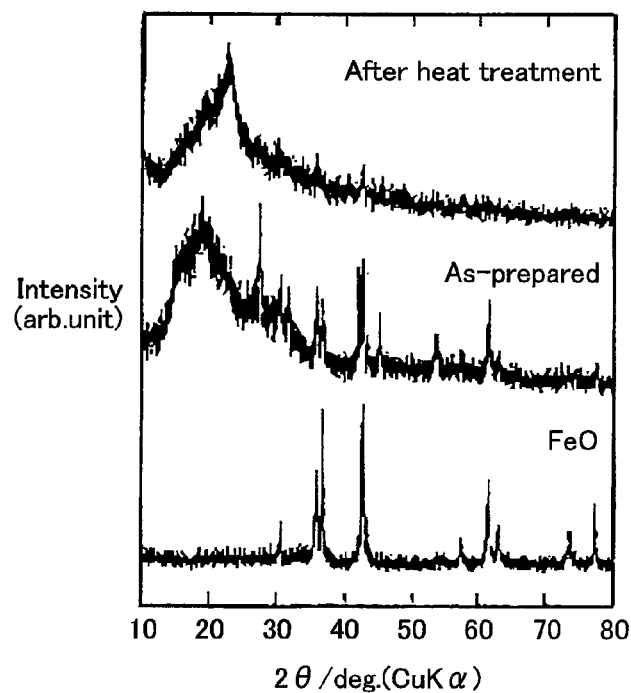
FIG. 32 represents FeO alone, FeO mixed with a solid state electrolyte, and thus heated, as represented in x ray diffraction patterns, respectively.
Figure 33:
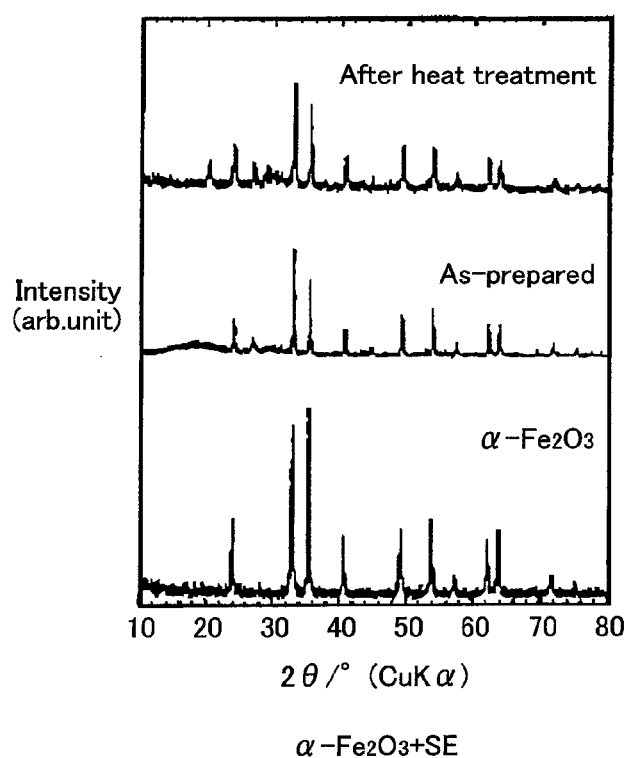
FIG. 33 represents $\alpha$-$Fe_2O_3$ alone, $\alpha$-$Fe_2O_3$ mixed with a solid state electrolyte, and thus heated, as represented in x ray diffraction patterns, respectively.

FIG. 28 represents $Li_4TiO_{12}$ alone, $Li_4TiO_{12}$ mixed with a solid state electrolyte, and thus heated, as represented in x ray diffraction patterns, respectively. FIG. 29 represents $LiFePO_4$ alone, $LiFePO_4$ mixed with a solid state electrolyte, and thus heated, as represented in x ray diffraction patterns, respectively.

FIG. 28 and FIG. 29 show a result of x ray diffraction for each sample. FIG. 28 is a graph of x ray diffraction provided when a positive electrode active material layer is provided such that $Li_4Ti_5O_{12}$ is used as a positive electrode active material. FIG. 29 shows a result of x ray diffraction of a positive electrode active material, that is provided when $LiFePO_4$ is used as the positive electrode active material. In each figure, the bottom, middle and top patterns represent the active material alone, the active material and the solid state electrolyte (indicated as "SE"), or sulfide glass, mixed together, and a composite material layer heated, as represented in x ray diffraction patterns, respectively. As shown in FIG. 28, the present invention's sample is not observed to have a peak that is attributed to the active material varying in intensity as the layer is heated. In FIG. 29, in contrast, a portion encircled by a dotted line indicates a peak that is attributed to the active material reduced in intensity as the layer is heated. In other words, it can be seen that the FIG. 29 comparative example shows that heating significantly changes a crystal structure. In contrast, FIG. 28 shows a peak appearing similarly as it did before heating, and it has been found in the present example that heating does not vary an active material's crystal structure. The present example is thus effective in maintaining a battery's charging/discharging characteristics.

Similarly, in FIG. 30 to FIG. 33, a positive electrode active material was provided such that $LiCoO_2$, $LiNi_{0.5}Mn_{0.5}O_2$, FeO, $\alpha$-$Fe_2O_3$ were used as an active material, and how a crystal structure observed before it was heated varied after it was heated was examined. Each sample excluding FeO does not have a crystal structure significantly varied, and it can be seen that after a heat treatment a preferable crystal structure is maintained.

It should be understood that the embodiments disclosed herein are illustrative and non-restrictive in any respect. The scope of the present invention is defined by the terms of the claims, rather than the above description, and is intended to include any modifications within the scope and meaning equivalent to the terms of the claims.

The invention claimed is:

1. A composite material layer comprising:
    an active material for one of a positive electrode and a negative electrode; and
    a mixture of sulfide glass and glass ceramic,
    said active material and said mixture being in contact with each other.

2. A solid state battery comprising:
    a positive electrode composite material layer including an active material for a positive electrode, and a mixture of sulfide glass and glass ceramic, with said active material and said mixture in contact with each other;
    a negative electrode composite material layer including an active material for a negative electrode, and a mixture of sulfide glass and glass ceramic, with said active material and said mixture in contact with each other; and
    a solid state electrolyte layer including sulfide glass and glass ceramic and sandwiched between said positive electrode composite material layer and said negative electrode composite material layer.

3. The solid state battery according to claim 2, wherein sulfide glass existing at a periphery of the solid state battery has completely transitioned to glass ceramic.

4. The solid state battery according to claim 2, wherein said active material includes at least one selected from the group consisting of $\alpha$-$Fe_2O_3$, $Li_4Ti_5O_{12}$, $LiCoO_2$, and $LiNi_{0.5}Mn_{0.5}O_2$.

5. A composite material layer comprising:
    an active material for one of a positive electrode and a negative electrode;
    sulfide glass; and
    glass ceramic,
    said active material and said sulfide glass being in contact with each other,
    said glass ceramic precipitating at opposite ends of the composite material layer.

6. A solid state battery comprising:
    a positive electrode composite material layer including an active material for a positive electrode, and glass ceramic, with said active material and said glass ceramic in contact with each other;
    a negative electrode composite material layer including an active material for a negative electrode, and glass ceramic, with said active material and said glass ceramic in contact with each other;
    a solid state electrolyte layer including glass ceramic;
    a first layer including sulfide glass and sandwiched between said positive electrode composite material layer and said solid state electrolyte layer; and
    a second layer including sulfide glass and sandwiched between said negative electrode composite material layer and said solid state electrolyte layer.

7. The solid state battery according to claim 6, wherein sulfide glass existing at a periphery of the solid state battery has completely transitioned to glass ceramic.

8. The solid state battery according to claim 6, wherein said active material includes at least one selected from the group consisting of $\alpha$-$Fe_2O_3$, $Li_4Ti_5O_{12}$, $LiCoO_2$, and $LiNi_{0.5}Mn_{0.5}O_2$.

* * * * *

UNITED STATES PATENT AND TRADEMARK OFFICE
CERTIFICATE OF CORRECTION

PATENT NO.       : 8,574,766 B2
APPLICATION NO. : 12/532543
DATED            : November 5, 2013
INVENTOR(S)      : Kimura et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 791 days.

Signed and Sealed this
Twenty-second Day of September, 2015

Michelle K. Lee
*Director of the United States Patent and Trademark Office*